United States Patent [19]

Nazaroff et al.

[11] Patent Number: 5,061,444

[45] Date of Patent: Oct. 29, 1991

[54] SYSTEMS FOR REDUCING DEPOSITION OF FLUID-BORNE PARTICLES

[75] Inventors: William W. Nazaroff, Berkeley, Calif.; Glen R. Cass, Cambridge, Mass.

[73] Assignee: California Institute of Technology, Pasadena, Calif.

[21] Appl. No.: 674,292

[22] Filed: Mar. 22, 1991

Related U.S. Application Data

[63] Continuation of Ser. No. 139,789, Dec. 29, 1987, abandoned.

[51] Int. Cl.$^5$ .............................................. B01J 19/00
[52] U.S. Cl. .......................................... 422/40; 427/1; 427/4; 427/22; 437/247; 437/248; 437/249; 437/946; 437/949; 437/950
[58] Field of Search .................... 422/1, 4, 21, 22, 23, 422/24, 38, 40; 437/247, 248, 249, 946, 949, 950

[56] References Cited

OTHER PUBLICATIONS

Gokoglu et al., "AIAA J.", 24, pp. 172–179, 1986.

G. B. Larrabee, "A Challenge to Chemical Engineers—Microelectronics", Chemical Engineering (Jun. 19, 1985), 51–59.

Douglas W. Cooper (1986), "Particulate Contamination and Microelectronics Manufacturing: An Introduction", Aerosol Sci. Technol. 5:287–299.

Abstracts by Locke et al. and by Peterson (1986) in Aerosols—Formation and Reactivity, Proceedings Second International Aerosol Conference, 22–26, Sep. 1986, Berlin.

B. Y. H. Liu and K. Ahn, "Particle Deposition on Semiconductor Wafers", Aerosol Sci. Technol. (1987) 6, 215–224.

N. Schafer and D. A. Kotz, "Successful Clean Room Design", ASHRAE Journal (Sep.) 1987, 25–28.

J. Corner and E. D. Pendlebury, "The Coagulation and Deposition of A Stirred Aerosol", Proc. Phys. Soc. (London) 1951, B65, 645.

J. G. Crump and J. H. Seinfeld, "Turbulent Deposition and Gravitational Sedimentation of an Aerosol in a Vessel of Arbitrary Shape", J. Aerosol Sic., 12, 405 (1981).

J. G. Crump, R. C. Flagan and J. H. Seinfeld, "Particle Wall Loss Rates in Vessels", Aerosol Sc. Technol., 2 (1983), 303.

K. Okuyama, Y. Kousaka, S. Yamamoto, and T. Hosokawa, "Particle Loss of Aerosols with Particle Diameters between 6 and 2000 nm in Stirred Tank", J. Colloid Interface Sci., (1986) 110, 214.

P. H. McMurry and D. Grosjean, "Gas and Aerosol Wall Losses in Teflon Film Smog Chambers", (1985) Envir. Sc. Technol., 19, 1176.

P. H. McMurry and D. J. Rader, "Aerosol Wall Losses in Electrically Charged Chambers", (1985) Aerosol Sci. Technol., 4, 249.

A. W. Harrison, "Quiescent Boundary Layer Thickness in Aerosol Enclosures Under Convective Stirring Conditions", (1979), J. Colloid Interface Sci., 69, 563.

J. D. Sinclair, L. A. Psota-Kelty, and C. J. Weschler, "Indoor/Outdoor Concentrations and Indoor Surface Accumulations of Ionic Substances", (1985), Atmos. Envir., 19, 315.

(List continued on next page.)

Primary Examiner—Robert J. Warden
Assistant Examiner—Timothy M. McMahon
Attorney, Agent, or Firm—Benoit Law Corporation

[57] ABSTRACT

Objects are protected against deposition of fluid-borne particles in a diameter range of from one-hundredth of a micron to several microns from a convection boundary layer flow, by establishing a temperature difference between surfaces of these objects and fluid adjacent thereto such that the temperature of these surfaces is higher by not more than 10K than that of the adjacent fluid, to such an extent that the thermophoretic effect dominates the combined effects of Brownian motion and gravitational deposition of the particles in the boundary layer flow. Highly advanced articles of manufacture are produced when those surfaces are changed structurally, such as during manufacture of integrated circuits, while the thermophoretic effect dominates the latter combined effects.

23 Claims, 6 Drawing Sheets

OTHER PUBLICATIONS

A. G. Scott, "Radon Daughter Deposition Velocities Estimated from Field Measurements", (1983) Hlth. Phys., 45, 481.

R. E. Toohey, M. A. Essling, J. Rundo and W. Hengde, "Measurements of the Deposition Rates of Radon Daughters on Indoor Surfaces", Rad. Prot. Dosim. (1984), 7, 143.

G. E. Schiller, "A Theoretical Convective-Transport Model of Indoor Radon Decay Products", (1984), Ph.D. Thesis, Department of Mechanical Engineering, University of California, Berkeley, Abstract.

H. H. Watson, "The Dust-Free Space Surrounding Hot Bodies", (1936), Trans. Faraday Soc., 32, 1073.

W. Zernik, "The Dust-Free Space Surrounding Hot Bodies", (1957), Br. J. Appl. Phys., 8, 117.

S. L. Goren, "Thermophoresis of Aerosol Particles in the Laminar Boundary Layer on a Flat Plate", (1977), J. Colloid Intrface Sci., 61, 77.

L. Tablot, R. K. Cheng, R. W. Schefer, and D. R. Willis, "Thermophoresis of Particles in a Heated Boundary Layer", 101, 737 J. Fluid Mech. (1980).

G. K. Batchelor and C. Shen, "Thermophroetic Deposition of Particles in Gas Flowing Over Cold Surfaces"(1985), J. Colloid Interface Sci., 107, 21.

S. Ostrach, "An Analysis of Laminar Free-Convection Flow and Heat Transfer About a Flat Plate Parallel to the Direction of the Generating Body Force", (1953) NACA Report 1111, U.S. Gov. Pntg. Off., Washington, D.C.

W. W. Nazaroff and G. R. Cass, "Particle Deposition from a Natural Convection Flow onto a Vertical Isothermal Flat Plate", 1987, J. Aerosol Sci., vol. 18, pp. 445–455.

A. Bejan, "Convection Heat Transfer", Wiley Interscience, New York, 1984, Ch. 4.

S. Globe and D. Dropkin, "Natural Convection Heat Transfer in Liquids Confined by Two Horizontal Plates and Heated from Below", (1959), J. Heat Transfer, 81, 24–28.

F. P. Incropera and D. P. DeWitt, *Fundamentals of Heat and Mass Transfer*, (1985), Wiley, New York, Ch. 9.

SYSTEMS FOR REDUCING DEPOSITION OF FLUID-BORNE PARTICLES

CROSS REFERENCE

This is a continuation of application Ser. No. 07/139,789, filed Dec. 29, 1987, now abandoned.

BACKGROUND OF THE INVENTION

1. Field of the Invention

The subject invention relates to systems for reducing deposition of fluid-borne particles, for protecting surfaces from such particles, and for protecting surfaces from such particles while the surfaces are being changed structurally, such as during manufacture of integrated circuits, while such surfaces are being protected against deposition of fluid-borne particles thereon. The subject invention also relates to articles made by processes which include protection of these surfaces during such processes.

2. Information Disclosure Statement

The following disclosure statement is made pursuant to the duty of disclosure imposed by law and formulated in 37 CFR 1.56(a). No representation is hereby made that information thus disclosed in fact constitutes prior art, inasmuch as 37 CFR 1.56(a) relies on a materiality concept which depends on uncertain and inevitably subjective elements of substantial likelihood and reasonableness and inasmuch as a growing attitude appears to require citation of material which might lead to a discovery of pertinent material though not necessarily being of itself pertinent. Also, the following comments contain conclusions and observations which have only been drawn or become apparent after conception of the subject invention or which contrast the subject invention or its merits against the background of developments which may be subsequent in time or priority.

The soiling of indoor surfaces due to the deposition of airborne particulate matter is a commonly observed phenomenon. Of particular concern is the potential for damage to paintings and other works of art. The aesthetic quality of such materials may certainly be deteriorated by an accumulated deposit of airborne particles. In addition, the useful lifetime of these objects may be limited to a small number of restorations, the frequency of which is determined, at least in part, by the rate of aerosol deposition.

In this context, the problem of relating the rate of deterioration of the visual quality of an object to the nature of its environment has two major components. One addresses the transport of particles from air to the surface; the other considers the interaction of the deposited particulate matter with the visual information transmitted from the object to the observer. The deposition of particles onto surfaces obviously leads to degradation of the visual qualities of the object.

In a different vein, work in clean rooms, including large-scale integrated circuit manufacturing, as well as other manufacturing processes, is increasingly impeded by deposition of air or fluid-borne particulate matter. While workers in the field are keenly aware of the problem, a more radical solution is required than what has generally been proposed and discussed in the art.

In this respect, G. B. Larrabee (1985), in an article entitled "A challenge to chemical engineers—Microelectronics," Chemical Engineering (June 19), 51–59, gave an overview of the microelectronics manufacturing process, commenting that "There is much to learn about particles and their control in semiconductor device manufacture."

Douglas W. Cooper (1986), in an article entitled "Particulate Contamination and Microelectronics Manufacturing: An Introduction," Aerosol Sci.Technol. 5:287–299, described the general problem of controlling particle contamination in the microelectronics industry.

Abstracts by Locke et al. and by Peterson (1986) in Aerosols—Formation and Reactivity, proceedings Second International Aerosol Conference, 22–26 September 1986, Berlin, illustrate that the problem of particle deposition in the semiconductor industry is recognized to be an important one and demonstrates that aerosol scientists are working to understand the deposition process.

B. Y. H. Liu and K. Ahn (1987), in an article entitled "Particle deposition on semiconductor wafers," Aerosol Sci. Technol., 6, 215–224 provided a theoretical analysis of particle deposition onto semiconductor wafers assuming forced laminar flow.

N. Schafer and D. A. Kotz (1987), in an article entitled "Successful clean room design," ASHRAE J., (September), 25–28, indicated the level of effort undertaken in the semiconductor industry to minimize airborne particle concentrations, recommending better clean room design.

Fluid circulation patterns in rooms are often driven by natural convection. Although many researchers have investigated the deposition of particles on surfaces, none have addressed the theoretical aspects of particle deposition onto a vertical isothermal surface in a natural convection flow. The combined effects of turbulence, Brownian motion, and gravitational settling on particle deposition in enclosures have been investigated theoretically by Corner, J. and Pendlebury, E. D. (1951), "The coagulation and deposition of a stirred aeorsol," Proc. Phys. Soc. (London), B64, 645, and Crump, J. G. and Seinfeld, J. H. (1981), "Turbulent deposition and gravitational settling of an aerosol in a vessel of arbitrary shape," J. Aerosol Sci., 12, 405, and experimentally by Crump, J. G., Flagan, R. C. and Seinfeld, J. H. (1983), "Particle wall loss rates in vessels," Aerosol Sci. Technol., 2, 303, and Okuyama, K., Kousaka, Y., Yamamoto, S. and Hosokawa, T. (1986), "Particle loss of aerosols with particle diameters between 6 and 2000 nm in stirred tank," J. Colloid Interface Sci., 110, 214.

That work has recently been expanded to account for the effects of electrostatic forces, of particular interest for experiments conducted in Teflon-film smog chambers by McMurry, P. H. and Grosjean, D. (1985), "Gas and aerosol wall losses in Tef smog chambers," Envir. Sc. Technol., 19, 1176, and McMurry, P. H. and Rader, D. J. (1985), "Aerosol wall losses in electrically charged chambers," Aerosol Sci. Technol., 4, 249. The particle loss rate due to deposition on chamber surfaces under natural convection flow conditions has been investigated experimentally by Harrison, A. W. (1979), "Quiescent boundary layer thickness in aerosol enclosures under convective stirring conditions," J. Colloid Interface Sci., 69, 563.

The surface accumulations of ionic substances have been related to indoor concentrations to determine the rates of particle deposition in a room, as apparent from Sinclair, J. D., Psota-Kelty, L. A. and Weschler, C. J. (1985), "Indoor/outdoor concentrations and indoor surface accumulations of ionic substances," Atmos. Envir., 19, 315.

The deposition loss rate has also been studied experimentally by Scott, A. G. (1983), "Radon daughter deposition velocities estimated from field measurements," Hlth Phys., 45, 481, and Toohey, R. E., Essling, M. A., Rundo, J. and Hengde, W. (1984), "Measurements of the deposition rates of radon daughters on indoor surfaces," Rad. Prot. Dosim., 7, 143, and theoretically by Schiller, G. E. (1984), "A theoretical convective-transport model of indoor radon decay products," Ph.D. thesis, Department of Mechanical Engineering, University of California, Berkeley, for unattached radon decay products, which are believed to exist as very small particles with effective diameters in the range 0.001–0.01 μm.

The influence of thermophoresis on particle migration near surfaces also has been investigated by Watson, H. H. (1936), "The dust-free space surrounding hot bodies," Trans. Faraday Soc., 32, 1073, Zernik, W. (1957), "The dust-free space surrounding hot bodies," Br. J. Appl. Phys., 8, 117, Goren, S. L. (1977), "Thermophoresis of aerosol particles in the laminar boundary layer of a flat plate," J. Colloid Interface Sci., 61, 77, Talbot, L., Cheng, R. K., Schefer, R. W. and Willis, D. R. (1980), "Thermophoresis of particles in a heated boundary layer," J. Fluid Mech., 101, 737, and Batchelor, G. K. and Shen, C. (1985), "Thermophoretic deposition of particles in gas flowing over cold surfaces," J. Colloid Interface Sci., 107, 21.

The definitive solution to the problem of heat and momentum transport to a vertical isothermal plate in a natural convection flow was reported by Ostrach, S. (1953), "An Analysis of laminar free-convection flow and heat transfer about a flat plate parallel to the direction of the generating body force," NACA Report 1111, U.S. Government Printing Office, Washington, D.C. Because of the analogy between heat and mass transfer, the extension of this solution to the deposition of highly reactive dilute gases is straightforward. However, for particles, because transport is influenced by factors in addition to advection and Brownian motion, the analogy does not hold.

SUMMARY OF THE INVENTION

It is a general object of this invention to overcome the disadvantages and to meet the needs expressed or implicit in the above Information Disclosure Statement or in other parts hereof.

It is a germane object of this invention to exploit our discovery of the importance of the role of thermophoresis in the migration of particles in the natural convection boundary layer adjacent to surfaces.

It is a related object of this invention to reduce deposition of fluid-borne particles from a convection boundary layer flow onto a surface by causing thermophoretic effect to dominate the combined effect of Brownian motion and gravitational deposition of the particles in the boundary layer flow, and of electrostatic attraction of particles from the boundary layer flow to the surface.

It is also a related object of this invention to reduce such deposition of fluid-borne particles by establishing a temperature difference between the surface and adjacent fluid such that the temperature of that surface is higher than that of the adjacent fluid.

It is also an object of this invention to preserve valuable works of art from damage due to airborne particles.

It is a similar object of this invention to prevent objectionable particle deposition on workpiece and product surfaces.

It is a related object of this invention to provide articles of manufacture which distinguish themselves substantially from the state of the art.

It is also an object of this invention to reduce rejects significantly during production of articles of manufacture.

It is a further object of this invention to aid very-large scale integration (VLSI) circuit manufacture significantly, and to enable further miniaturization beyond the state of the art.

From one aspect thereof, the invention resides in a method of reducing deposition of fluid-borne particles in a diameter range of from one-hundredth of a micron to several microns from a convection boundary layer flow onto a surface of an object to be protected, comprising the step of causing thermophoretic effect to dominate the combined effects of Brownian motion and gravitational deposition of said particles in said boundary layer flow by establishing a temperature difference between said surface of the object and adjacent fluid such that the temperature of said surface is higher than that of said adjacent fluid by not more than 10 K.

From a related aspect thereof, the invention resides in a system for reducing deposition of fluid-borne particles in a diameter range of from one-hundredth of a micron to several microns from a convection boundary layer flow onto a surface of an object to be protected, comprising, in combination, means for determining the temperature of fluid adjacent said surface of the object, and means connected to said determining means for establishing a temperature difference between said surface of the object and said adjacent fluid such that the temperature of said surface is higher than that of said adjacent fluid, and thermophoretic effect dominates the combined effects of Brownian motion and gravitational deposition of said particles in said boundary layer flow.

According to a preferred embodiment of the invention, a surface is protected from particle deposition is herein disclosed, while such surface is being changed structurally, such as during a manufacturing process.

From another related aspect thereof, the invention resides in articles of manufacture produced with a process of the subject invention or of an embodiment thereof.

Other aspects of the invention will become apparent in the further course of this disclosure, and no restriction to aspect is intended by this Summary of the Invention.

BRIEF DESCRIPTION OF THE DRAWINGS

The subject invention and its various aspects and objects will become more readily apparent from the following detailed description of preferred embodiments thereof, illustrated by way of example in the accompanying drawings, in which like reference numerals designate like or functionally equivalent parts, and in which:

FIG. 1 is a diagrammatic side view of a room with an object installed therein and a block diagram of a system for reducing deposition of fluid-borne particles on a surface of that object pursuant to an embodiment of the invention;

FIG. 2 is a detail view of a modification according to an embodiment of the invention employable in the system of FIG. 1 or 3, for instance;

FIG. 3 is a view similar to FIG. 1 showing a modification according to a further embodiment of the invention;

FIGS. 4 to 8 are detail views of various modifications according to different embodiments of the invention employable in the system of FIG. 1 or 3, for instance;

FIG. 9 is a graph of dimensionless particle flux in terms of temperature difference between a surface and adjacent fluid and also in terms of thermophoresis parameters, and includes a family of curves for a range of particle sizes; and FIGS. 10 to 12 are graphs including families of curves for stated temperature differences indicating particle deposition velocity relative to selected surface orientations.

DESCRIPTION OF PREFERRED EMBODIMENTS

Figure 1:
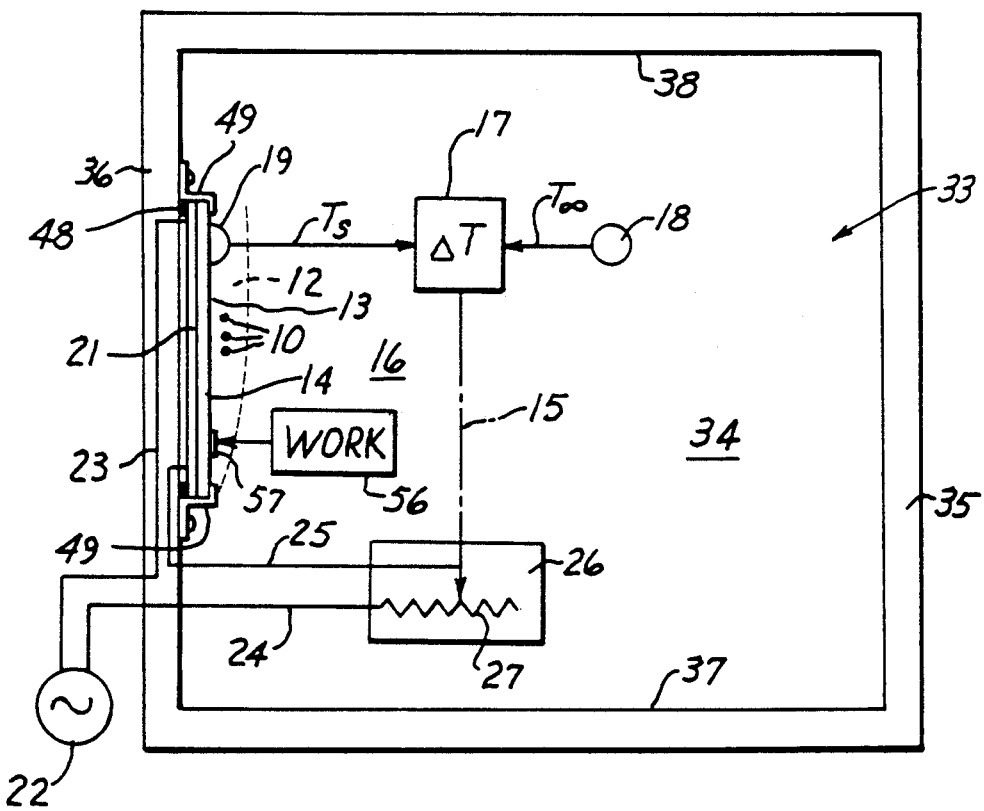

The drawings illustrate embodiments of the invention for reducing deposition of air or fluid-borne particles 10 over a certain diameter range from a convection boundary layer flow 12 onto a surface 13 of an object 14 to be protected. By way of example, that object may be a painting or other work of art displayed in a gallery or museum or a wafer or other workpiece employed in semiconductor or other manufacture, to name but a few examples of the wide utility of the subject invention and of its embodiments.

As explained more fully in the further course of this disclosure, the illustrated embodiments of the invention also provide systems and controls 15 etc. causing the thermophoretic effect to dominate the combined effects of Brownian motion and gravitational sedimentation of the particles 10 in the boundary layer flow 12. The illustrated embodiments accomplish that by establishing a temperature difference $\Delta T$ between the surface of the object 14 and adjacent fluid such that the temperature of that surface 13 is higher than that of the adjacent fluid 16.

Figure 3:
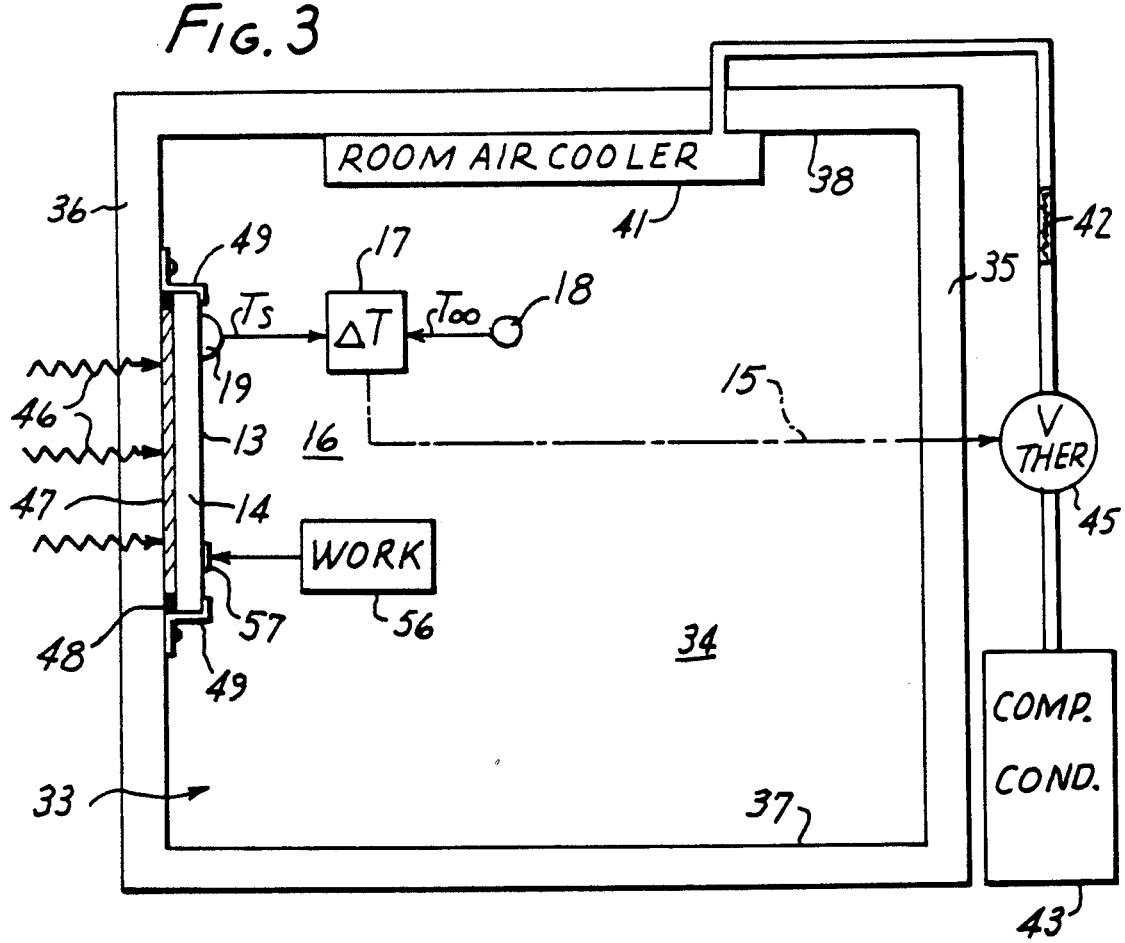

To this end, FIGS. 1 and 3 show a differential thermostat 17 or equivalent apparatus for determining the temperature difference $\Delta T$ between the object surface 13 to be protected and adjacent air or fluid 16. Expressed differently, $\Delta T$ is the temperature $T_s$ of the object 14 at the surface 13 minus the temperature of the adjacent fluid $T_\infty$. By way of example, the adjacent fluid 16 may be air, another gas, or a liquid, depending on the environment in which the invention is practiced. Accordingly, $T_\infty$ may be air temperature or room temperature, or may be the temperature of a liquid or other fluid in which the object 14 is submerged at least over its surface 13.

Accordingly, a room temperature thermometer or other sensor 18 that supplies the differential thermostat 17 with an electric or other signal indicative of the temperature of the adjacent fluid 16 may be employed in conjunction with a thermocouple 19 that supplies the differential thermostat with a signal indicative of the surface temperature $T_s$. Of course, the subject invention is not limited in its practice to the use of any particular means for determining and establishing any temperature differences within the broad scope of its operation.

Figure 2:
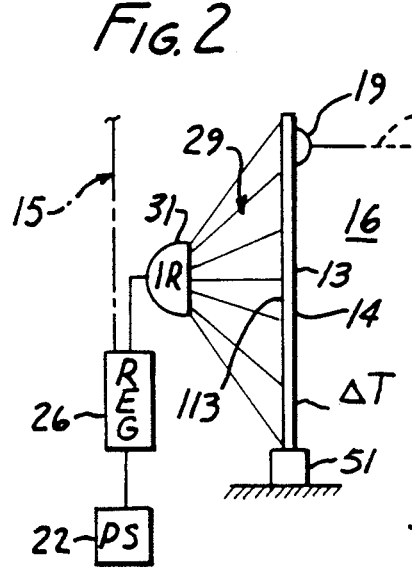

Pursuant to the embodiments of FIGS. 1 and 2, the object 14 is heated at its surface 13 relative to the adjacent fluid 16. According to FIG. 1, this may be done by providing the object 14 with a resistive foil or other electric heater 21 which, for instance, may extend over its backside opposite the surface 13 to be protected against particle deposition by the subject invention. A source of alternating current or other electrical energy 22 is shown connected to the heater 21 by leads 23, 24 and 25, for supplying the requisite heating current. A control 26 of that heating process is shown interposed between current supply leads 24 and 25. By way of example, a simple variable resistor 27 controlled by the differential thermostat as shown at 15 is shown in FIG. 1 as a means for regulating or controlling the temperature $T_s$ of the object 14 at the surface 13. Put differently, the room temperature thermometer or other sensor 18 is representative of a means for determining the temperature $T_\infty$ of fluid 16 adjacent the surface of the object 13, while the phantom line 15 and components 17, 19 and 21 to 27 are illustrative of means connected to the temperature determining means 18 for establishing a temperature difference $\Delta T$ between the surface of the object 14 and the adjacent fluid such that the temperature $T_s$ of that surface 13 is higher than that of the adjacent fluid, and thermophoretic effect dominates the combined effects of Brownian motion and gravitational sedimentation of the particles in the boundary layer flow 12.

In FIG. 1, such means 15 etc. for establishing the requisite temperature difference $\Delta T$ include means 21 to 27 for heating the object 14 at its surface 13 relative to the adjacent fluid 16. As shown in FIG. 1, this may be done by heating the surface 13 through the object 14. However, this is only by way of illustration, and not by way of limitation.

According to FIG. 2, the surface 13 to be protected against particle deposition is heated by radiation 29 emitted by an infrared or other radiation source 31. Again, heating of the surface 13 through the object 14 is shown by way of illustration, rather than by way of any limitation. Isothermal heating over or across the surface 13 is presently preferred, but non-uniform heating is also within the scope of the invention, as long as any minimum heating 16 still provides a $\Delta T$ as herein required for the particular case.

Also, flat or irregular surfaces may be protected according to the subject invention.

In FIG. 2, the heat source again is energized from an electric power source 22 through a control or regulator 26 which, driven by the differential thermostat 17 or equivalent control 15, regulates surface temperature by controlling the amount of energy in irradiation 29.

The remainder of the system shown in FIG. 2 may be the same as that shown in FIG. 1. In this respect and in general, the object 14, with surface 13, and possibly the components 18 and 19, may be located in a room or in a fluid chamber 33, as the case may be, defined by walls 34, 35, 36, 37 and 38. In the case of a room, 37 and 38 would be a floor and a ceiling, respectively. Special clean room construction, as described in the above mentioned literature and otherwise, may be employed for implementation of the embodiments or broadly for the invention herein disclosed.

The embodiment shown in FIG. 3 may be employed in combination with the embodiment of FIG. 1, if cooling of the fluid or room air 16 is required, in order to achieve the requisite temperature differential $\Delta T$, as more fully disclosed below. Again, FIG. 3 shows a fluid chamber or room 33 having walls 34 to 38. Of course, as in FIG. 1, the room or chamber 33 has another wall located toward the viewer, but not visible in the drawings, since it has been cut away to show the inside of the room or chamber. In this respect, no sectioning of the walls 34 to 38 is shown, since they may be of concrete, wood, metal, plastics, plaster board, brick, or any other material or composition generally used in the building or construction industry, or otherwise considered useful to the implementation of the subject invention and its embodiments.

The embodiment shown in FIG. 3 works with cooling of the fluid 16, with or without heating of the object 14. By way of example, a room air cooler 41 is shown for establishing the desired temperature differential ΔT, and the cooler 41 is supplied with a coolant 42 by a compressor and condenser unit 43. In that case, the room air cooler 41 may include a coolant evaporator and heat exchanger. Employment of other cooling systems is also within the scope of the subject invention, including supplying cool air or another fluid from a remote source to the room 33 or other space. A cooling system based on the Peltier effect may be employed for cooling the fluid 16 relative to the object surface 13, or for heating the object relative to the fluid.

In FIG. 3, fluid temperature $T_\infty$ is again determined by a temperature sensor 18, while object surface temperature $T_s$ is determined by a temperature sensor 19, with the two temperature signals thus produced acting on a differential thermostat or other control device, as in FIG. 1.

The temperature control 15 thus provided is applied to regulation of the cooling effect. A thermal valve 45 is shown in FIG. 3 for regulating the coolant 42, but this is just symbolic of any suitable temperature regulating means for controlling the cooling system.

The object 14 need not be heated in the embodiment of FIG. 3, as long as it does not acquire a temperature that brings the temperature difference between the object 14 and the fluid 16 to a value that is below the threshold needed to produce the effect of the subject invention. For instance, if the object 14 is only for a short while in the room or chamber 33, such as in certain manufacturing processes, it is well possible that the temperature at the surface 13 remains sufficiently high for a realization of the requisite ΔT more fully disclosed below.

On the other hand, heating of the object 14 through the wall 36 may, for instance, be employed, as indicated by wavy lines 46. In that case, the space between the wall 36 and the object 14 may be occupied by a metal plate or other heat transfer medium 47, that is isolated relative to the fluid 16 or room 33 by a frame of insulating material 48, or the object 14 could be in direct thermal contact with the wall. The surface 13 could be the surface of the chamber itself, in which case object 14 and wall 36 would be the same.

Natural transmission or conduction of heat through the wall 36 from the outside thereof may be employed for this purpose. Alternatively, heating pipes or electric heating devices may be embedded in the wall 36 at the object 14 and/or cooling pipes in the remainder of the walls, in order to establish and maintain the desired temperature differential T. Passive solar systems may be employed for heating the walls.

In FIGS. 1 and 3, the object surface 13 to be protected is vertical relative to the floor 37 or by reference to the earth's gravitational field. Means for mounting the object 14 with its surface 13 in a vertical position include brackets 49 attaching the object to the wall 36. The peripheral insulating spacer 48 may be employed in FIG. 1 as well as in FIG. 3. The brackets 49 may be of an insulating material or may otherwise be insulated relative to the object, if they would induce objectionable heat loss from the object 14.

Within the scope of the subject invention, the object 14 need not be mounted on a wall, but may be free-standing in a room or chamber 33. Accordingly, FIG. 2 shows the object 14 mounted on a stand 51 such that its surface 13 extends vertically. The component 51 may be a conveyer on which the object 14 is transported through the room or chamber 33. Within the scope of the invention, FIG. 2 may be turned around so that the object 14 is suspended from the conveyer or other component 51. In either case, it will be noted that the object 14 in FIG. 2 has two free surfaces 13 and 113 on which the subject invention may be practiced by establishment of the requisite temperature differential ΔT relative to the environment 16.

Figure 9:
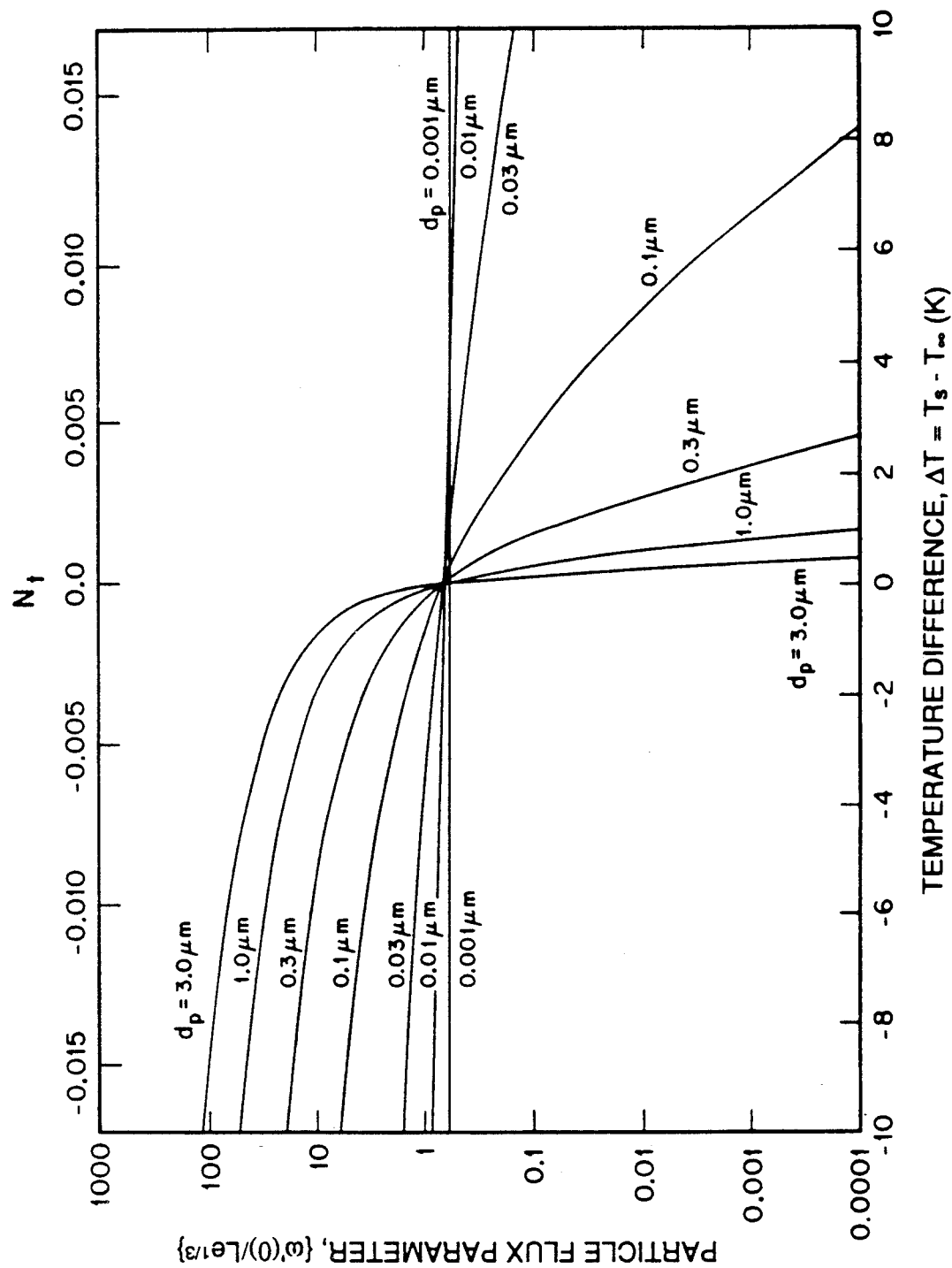

For a determination of the temperature differential requisite to the operation of the embodiments of FIGS. 1 to 3, reference may be had to FIG. 9 hereof. For the purpose of this disclosure, the particle deposition velocity, $v_d$, is defined as the particle flux to the surface 13 (number of particles deposited per unit of surface area per unit time) divided by the particle concentration in the fluid (number of particles per unit volume).

In particular, FIG. 9 shows a dimensionless particle flux:

$$\{\omega'(0)/Le^{\frac{1}{2}}\}$$

onto a vertical isothermal plate or surface 13 for particle diameters $d_p$, in the range of from 0.001 to 3.0 microns assuming that the fluid 16 is air having a temperature $T_\infty$ of 293 degrees Kelvin (K).

In FIG. 9 that dimensionless particle flux is related to the deposition velocity, $v_d$, by the expression:

$$v_d = (4\,Pr)^{-\frac{1}{4}} \alpha^{\frac{1}{2}} D^{\frac{1}{2}} \frac{Ra_x^{\frac{1}{4}}}{x} \{\omega'(0)/Le^{\frac{1}{2}}\}. \quad (1)$$

wherein: ω'(0) is the slope of the normalized particle concentration profile at the surface, and the other factors are defined below.

FIG. 9 also shows dimensionless particle flux for thermoparameters $N_t$ in the range of from −0.017 to 0.017, corresponding to a temperature difference $\Delta T = (T_s - T_\infty)$ in a range of from −10 to 10 K or °C. The parameter $N_t$ is defined as:

$$N_t = K(T_s - T_\infty)/T_\infty$$

all of these factors being defined below.

As apparent from FIG. 9, a temperature difference, ΔT, whereby the object surface 13 is only one half of a degree higher than its environment, reduces deposition of particles in the 3 micron and larger diameter range by a factor of 10,000 or more. Deposition of particles down to the one micron diameter range is practically eliminated by thermophoresis, when the surface 13 is as little as a fraction of a degree higher than the temperature of the adjacent fluid 16.

A higher relative surface temperature will provide substantial protection from deposition of particles down to one-tenth of a micron. Even the deposition of particles as small as one-hundredth of a micron is significantly reduced by a higher surface temperature in the 10 degree range, if one considers that the ordinate in FIG. 9 is on a logarithmic scale.

The curves depicted in FIG. 9 and the methods used to generate them have general applicability and may be employed pursuant to a preferred embodiment of the subject invention for reducing deposition of air-borne particles.

In particular, flux to a surface 13 of air-borne particles 10 of diameters listed in FIG. 9 may be reduced by establishing a temperature difference ($\Delta T$) between that surface of the object (of temperature $T_s$) and adjacent fluid (temperature $T_\infty$) pursuant to curves in FIG. 9 corresponding to those particle diameters as set forth in FIG. 9, in which the curves are individually labelled in terms of particle size or diameter.

In mathematical terms, a preferred embodiment of the subject invention reduces deposition of fluid-borne particles 10 in a diameter range of from 1/100 of a micron to several microns from a convection boundary layer flow 12 onto a vertical surface 13 of an object 14 to be protected, by establishing a temperature relationship as shown in FIG. 9 or as calculated by the method used to construct FIG. 9 as described in the Analysis set forth below.

As an approximation, the following temperature relationship may be provided:

$$\Delta T >> \frac{T_\infty}{K} Le^{-\frac{2}{3}} Pr^{-1} \quad (2)$$

wherein:

$\Delta T$ is the temperature of the object at the surface 13 minus the temperature of the adjacent fluid, $T_\infty$, K is the thermophoresis coefficient of the particles 10, Le is the particle Lewis number, Pr is the Prandtl number of the fluid 16, and $>>$ means 3 or more times higher than or, briefly, several times higher than.

The Prandtl number is equal to $\nu/\alpha$, where $\nu$ is the kinematic viscosity of the fluid 16 and $\alpha$ is its thermal diffusivity. Equation (2) is valid for fluids with a Prandtl number of about one, such as for air or other gases, and for Prandtl numbers higher than one, such as water or other liquids. The more exact results obtained by the procedure used to construct FIG. 9 and set forth in the Analysis below apply for all Prandlt numbers.

The above mentioned thermophoresis coefficient of the particles 10 generally has a value in the range of from 0.1 to 1.2 for particles in air.

The Lewis number is equal to $\alpha/D$, where D is the coefficient of Brownian diffusivity of the particles 10, and $\alpha$ has already been defined above.

Figure 4:
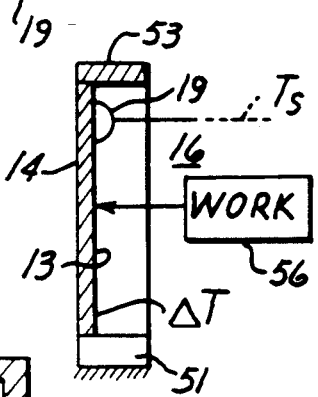

As shown in FIG. 4 and some of the other drawings, particle deposition may be reduced or otherwise altered by enclosing the surface 13 laterally. This may, for instance, be done by providing a frame 53 around the surface 13 or object 14. As indicated at the bottom of FIG. 4, part of the enclosure may be constituted by the above mentioned carrier or support 51.

What has been said so far for vertical surfaces, may also be applied to walls 34, 35, 36, etc. In this respect and in general, we have found that thermophoresis plays a very important role in the deposition of particles with a diameter greater than about one-hundredth of a micron and particularly with diameters greater than about five-hundredths of a micron. For example, for particles of 0.22 micron diameter, a representative size for cigarette smoke, the deposition velocity is more than ten times greater to a wall that is one degree cooler than the air, than to a wall that is one degree warmer. Thus, vertical surfaces soil much more rapidly, if they are cool instead of being warm relative to the room air 16.

Figure 10:
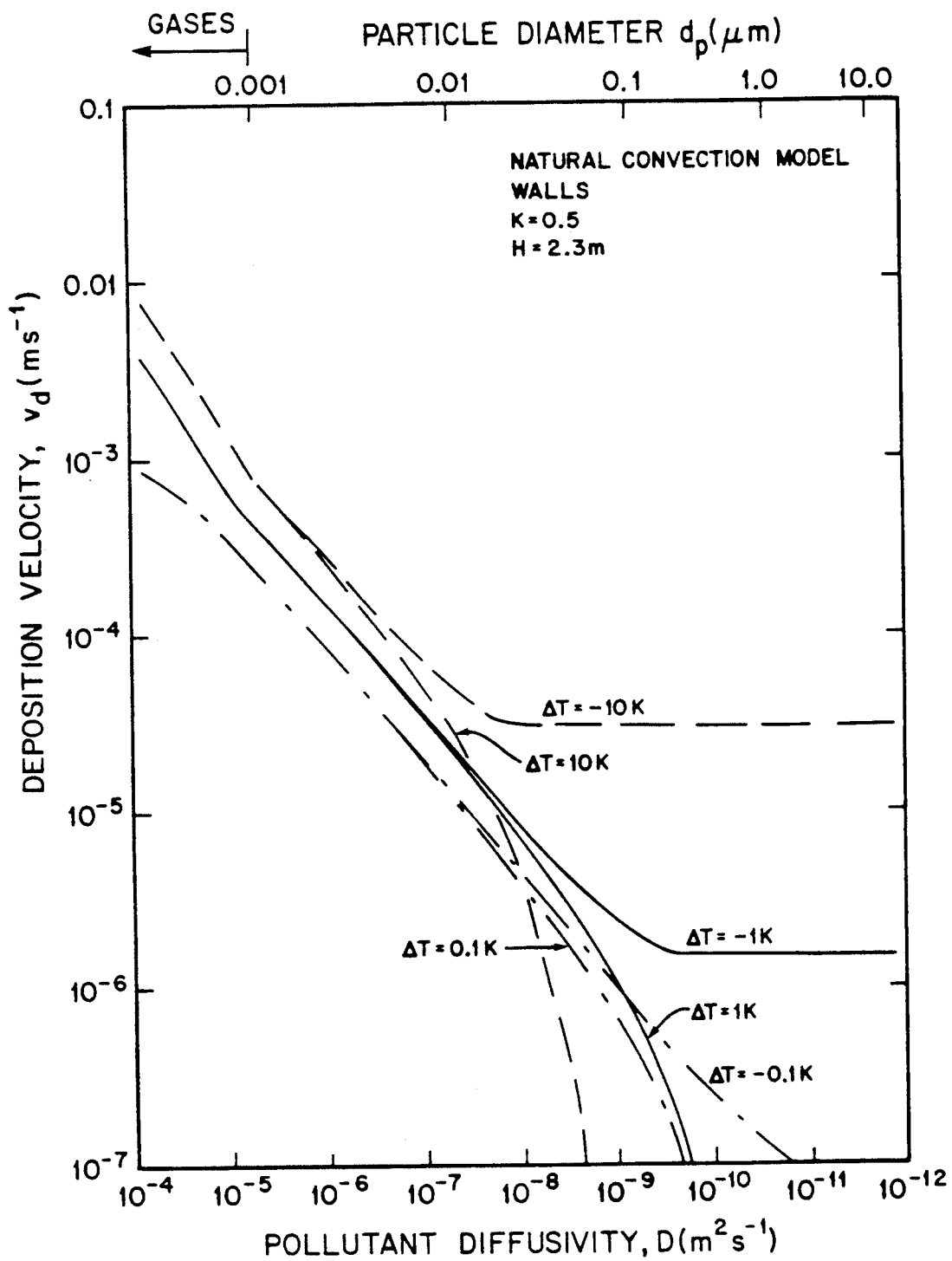

These and other features of a preferred embodiment of the invention are illustrated by FIG. 10, showing deposition velocity, $v_d$, for particles in air in terms of particle diameter, $d_p$, and pollutant diffusivity, D. These teachings may also be applied to vertical surfaces that are not walls.

According to a preferred embodiment of the invention, gravitational sedimentation of particles 10 is reduced by arranging the object 14 such that its surface 13 is located within a range including and extending from a substantially vertical to and including a downward-facing horizontal orientation of that surface to be protected by the processes of the subject invention.

Figure 5:
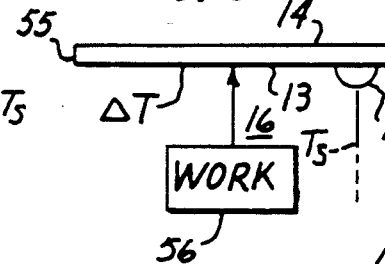
Figure 6:
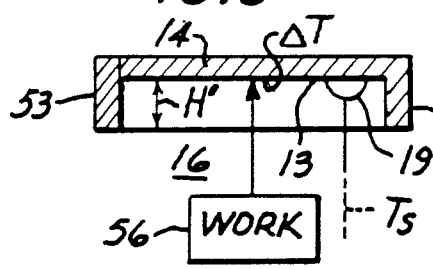

In this respect, FIGS. 1 through 4 show a vertical orientation at or near one end of the range just mentioned, while FIGS. 5 and 6 show a downward-facing horizontal orientation at or near the other end of that range.

In this respect, FIGS. 5 and 6 may be taken to represent a ceiling of a room or building or a downward-facing surface of an object 14. By way of example, the downward-facing surface 13 may be a work surface of a silicon wafer or other workpiece. However, the utility of the subject invention is not so limited. For instance, Michelangelo's frescoes on the ceiling of the Sistine Chapel in Rome are a beautiful example of a work of art whose preservation could benefit greatly from the subject invention. In particular, heating the Sistine Chapel below the ceiling, while the ceiling remains at the same temperature or, through external heat loss, at an even lower temperature than the adjacent air in the Chapel, can only hasten an already progressive deterioration of Michelangelo's beautiful work. By heating his frescoes through the ceiling to a temperature slightly above that of the Chapel air, or by conversely cooling the adjacent air in the Chapel, soiling of those frescoes could be greatly reduced, if not altogether stopped for practical purposes.

Figure 11:
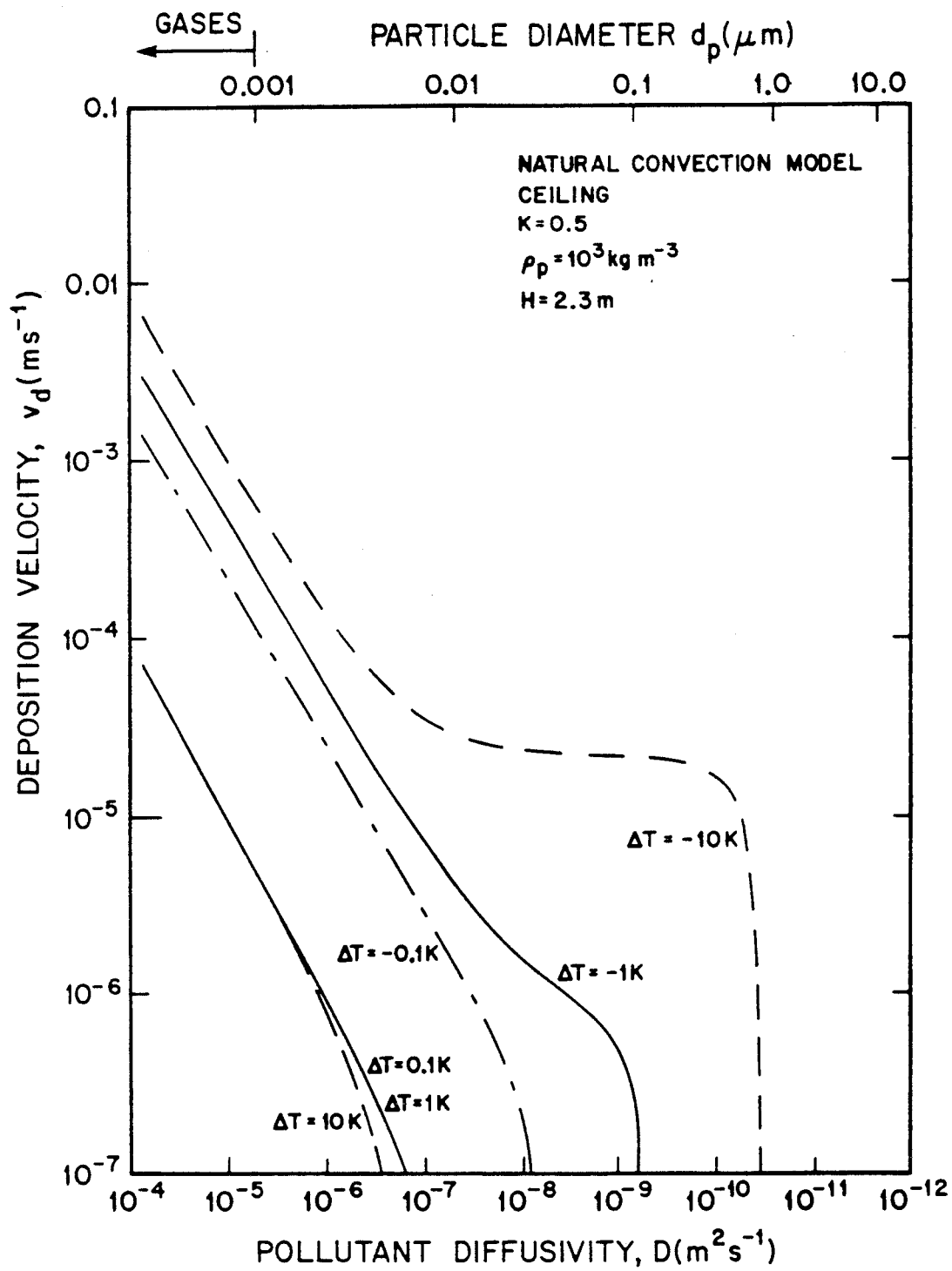

Further teachings in this respect are apparent from FIG. 11, which shows deposition velocity for particles in air in terms of particle diameter and pollutant diffusivity for a ceiling or downward-facing other surface 13 as depicted, for instance, at 38. Of course, with respect to FIGS. 4 to 8, it should be recognized that they show only a fraction of the illustrated embodiments which, in other respects may, for instance, be the same as in FIGS. 1, 2 or 3. The designation T is used somewhat loosely in FIGS. 2 and 4 to 8 to illustrate that fact.

If it is the ceiling 38 that is to be protected against particle disposition, then the room air cooler 48 should not cover the same, since particle deposition is stronger on cool surfaces, than on relatively warm ones, as we have just seen.

In this respect and in general, the following temperature relationship is established with respect to a downward-facing surface 13 of an object such as in FIG. 5:

$$\Delta T > \frac{T_\infty}{KSc} - \frac{v_g T_\infty L}{K\nu\{0.27 Ra_L^{\frac{1}{4}}\}} \quad 10^5 < Ra_L < 10^{10} \quad (3)$$

wherein:

$\Delta T$ is the temperature of the object at said surface minus the temperature of said adjacent fluid, $T_\infty$, K is the thermophoresis coefficient of the particles, Sc is the particle Schmidt number,
$v_g$ is gravitational particle settling velocity,
$\nu$ is the kinematic viscosity of the fluid,
L is the characteristic length of the surface 13, given by the ratio of surface area to surface perimeter, and
$Ra_L$ is the Rayleigh number of the flow 12, defined by $$Ra_L = \frac{g\beta|\Delta T|L^3}{\alpha\nu}$$

wherein:
g is the acceleration of gravity,
$\alpha$ is the thermal diffusivity of the fluid 16, and
$\beta$ is the coefficient of thermal expansion of the fluid 16.

The Schmidt number is given by $\nu/D$, where $\nu$ is the kinematic viscosity of the fluid 16 and D is the coefficient of Brownian diffusivity of the particles.

Figure 7:
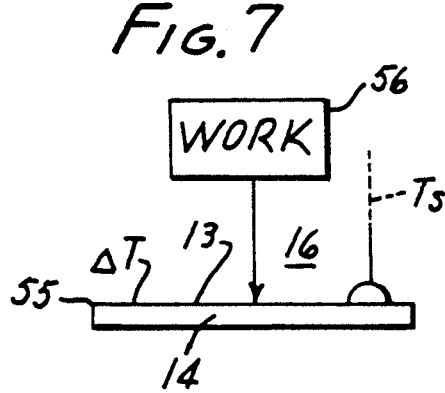

It may be noted in this respect that the surface 13 is open to fluid flow at its perimeter in the embodiments of FIGS. 5 and 7. On the other hand, the surface 13 is laterally enclosed in FIGS. 6 and 8.

For instance, according to the preferred embodiment of the invention shown in FIG. 6, the surface 13 of the object 14 faces downwardly and is provided with an enclosure which, as in FIG. 4, may be a frame around the surface 13. However, as shown at 153 in FIGS. 6 and 8, the enclosure actually may be integral with the object 14, or that object may already be of such a structure that object and enclosure are of one piece.

For a ceiling 38, or for another enclosed downward-facing surface 13 illustrated in FIG. 6, a preferred embodiment of the subject invention establishes the following temperature relationship:

$$\Delta T > \frac{T_\infty}{KSc} - \frac{v_g T_\infty H}{2K\nu} \quad (4)$$

wherein:
$\Delta T$ is the temperature of the object at the surface 13 minus the temperature of the adjacent fluid, $T_\infty$,
K is the thermophoresis coefficient of particles 10,
Sc is the particle Schmidt number,
$v_g$ is the gravitational particle settling velocity,
$\nu$ is the kinematic viscosity of the fluid, and
H is the height of a full enclosure, such as 34–38 in FIGS. 1 and 3. In the case of a partial enclosure 53 and 153, H is twice the height corresponding to H' shown in FIGS. 6.

Figure 8:
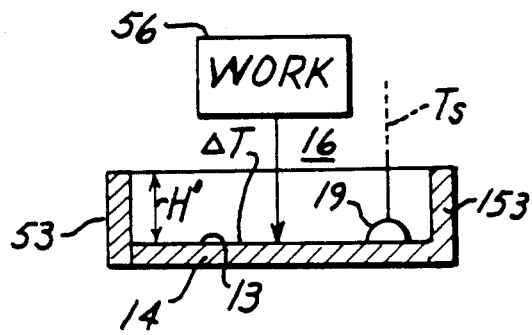

The teachings of FIGS. 7 and 8 may, for instance, be applied to the floor 37 of the room or chamber 33, or to the case of an upward-facing surface 13 of an object 14 that is either left open to fluid flow at its perimeter 55, as shown in FIG. 7, or that is laterally enclosed as shown at 34 to 36 in FIG. 3 or at 53 and 153 in FIG. 8.

Figure 12:
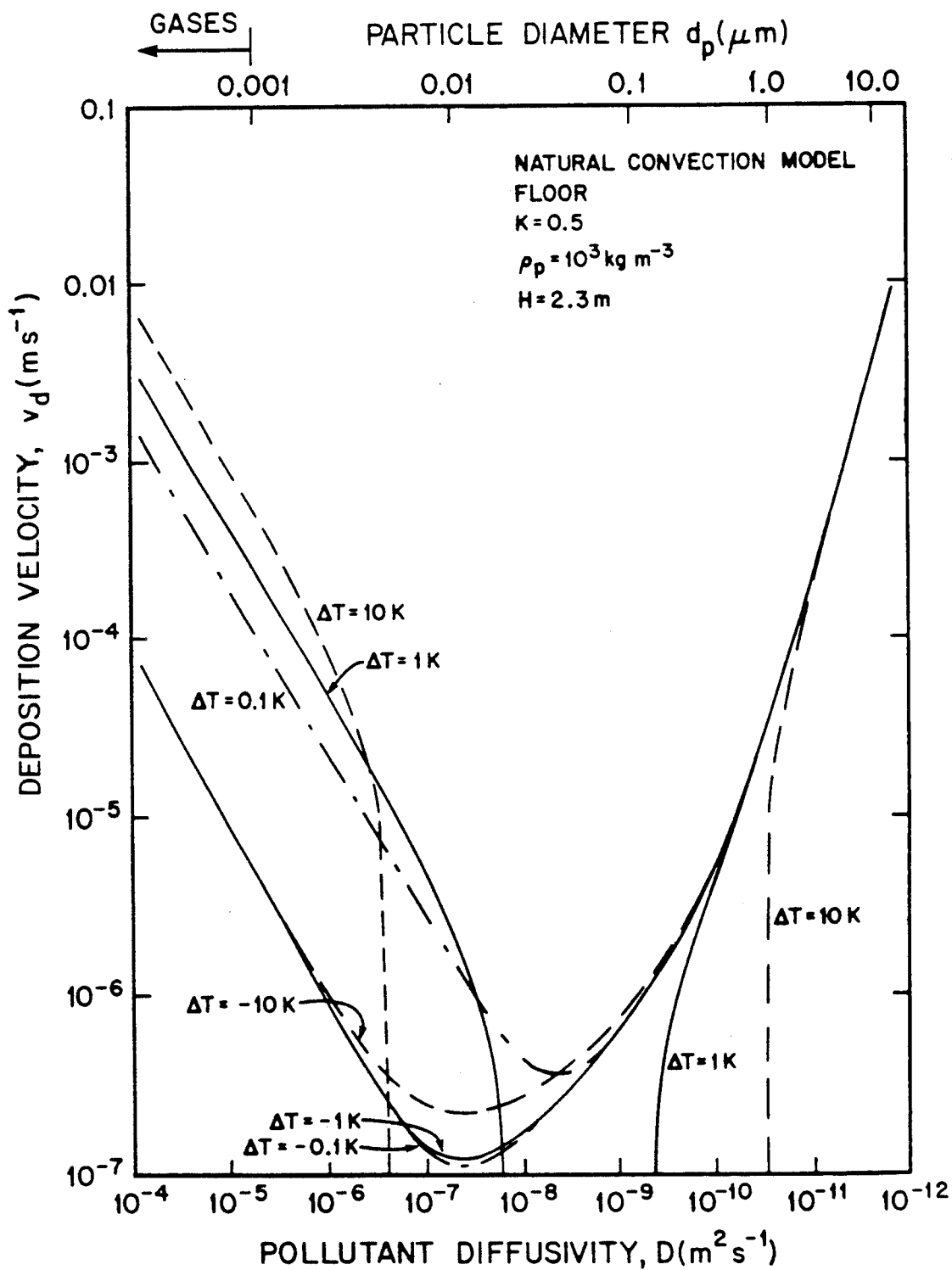

FIG. 12 shows deposition velocity for particles in air in terms of pollutant diffusivity and particle diameter for a floor or horizontal surface facing upwardly. A certain particle density, $\rho_p$ is indicated in FIGS. 11 and 12 by way of example.

As seen in FIG. 12, the particle deposition velocity never goes below $10^{-7}$ meters per second for the indicated particle sizes, when the surface 13 of the object is cooler than the adjacent fluid 16. On the other hand, remarkable reductions in deposition velocities for particle diameters between approximately 0.02 and 0.2 microns are already achieved when the surface 13 is only one degree hotter than the adjacent fluid. Heating the surface to 10 degrees relative to the adjacent fluid drastically reduces deposition for particles of diameters between about 0.005 microns and 1 micron. If one considers that the force of gravity attracts particles to a floor or upwardly-facing horizontal surface, FIG. 12 provides a particularly striking illustration of the efficacy of the dominance of the thermophoretic effects induced by the subject invention, over such effects as gravitational sedimentation.

For Rayleigh numbers of fluid flow between $10^4$ and $10^7$ and a surface 13 of the object facing upwardly as depicted in FIG. 7, an embodiment of the subject invention establishes the following temperature relationship:

$$\Delta T > \frac{T_\infty}{KSc} + \frac{v_g T_\infty L}{K\nu\{0.54\, Ra_L^{\frac{1}{4}}\}} \quad 10^4 < Ra_L < 10^7 \quad (5)$$

wherein:
$\Delta T$ is the temperature of the object at the surface 13 minus the temperature of the adjacent fluid, $T_\infty$,
K is the thermophoresis coefficient of the particles,
Sc is the particle Schmidt number, $v_g$ is gravitational particle settling velocity, $\nu$ is the kinematic viscosity of the fluid, L is the characteristic length of the surface 13, given by the ratio of its area to its perimeter, and $Ra_L$ is the Rayleigh number of the flow, defined by $$Ra_L = \frac{g\beta|\Delta T|L^3}{\alpha\nu}$$

where:

g is the acceleration of gravity, $\alpha$ is the thermal diffusivity of the fluid 16, and $\beta$ is the coefficient of thermal expansion of the fluid 16.

For Rayleigh numbers of fluid flow between $10^7$ and $10^{11}$ a preferred embodiment establishes for a surface 13 of the object facing upwardly as depicted in FIG. 7 the following temperature relationship:

$$\Delta T > \frac{T_\infty}{KSc} + \frac{v_g T_\infty L}{K\nu\{0.15\ Ra_L^{1/3}\}} \quad 10^7 < Ra_L < 10^{11} \tag{6}$$

wherein:

$\Delta T$ is the temperature of the object at the surface minus the temperature of said adjacent fluid, $T_\infty$, K is the thermophoresis coefficient of the particles, Sc is the particle Schmidt number, $v_g$ particle settling velocity, $\nu$ is the kinematic viscosity of the fluid, L is the characteristic length of the surface, given by the ratio of surface area to surface perimeter, and $Ra_L$ is the Rayleigh number of the flow, defined by $$Ra_L = \frac{g\beta|\Delta T|L^3}{\alpha\nu}$$

wherein:

g is the acceleration of gravity, $\alpha$ is the thermal diffusivity of the fluid, and $\beta$ is the coefficient of thermal expansion of the fluid.

For Rayleigh numbers of fluid flow greater than $10^3$ and surfaces 13 that face upwardly and are provided with a full enclosure, such as at 34 to 38 in FIG. 3, an embodiment of the subject invention establishes the following temperature relationship:

$$\Delta T > \frac{T_\infty Le^{0.074}}{KSc} + \frac{v_g T_\infty H}{K\nu\{0.087 \, Ra_H^{\frac{1}{4}} \, Pr^{0.074}\}} \quad (7)$$

wherein:
ΔT is the temperature of the object at the surface 13 minus the temperature of the adjacent fluid, $T_\infty$,
K is the thermophoresis coefficient of the particles,
Le is the particle Lewis number,
Pr is the Prandtl number of the fluid,
Sc is the particle Schmidt number,
$v_g$ is gravitational particle settling velocity,
$\nu$ is the kinematic viscosity of the fluid, and
$Ra_H$ is the Raleigh number of the flow, defined by $$Ra_H = \frac{g\beta|\Delta T|H^3}{\alpha\nu}$$

wherein:
g is the acceleration of gravity,
α is the thermal diffusivity of the fluid 16,
β is the coefficient of thermal expansion of the fluid 16, and
H is the height of said enclosure.

The particle Schmidt number, Sc, is equal to $\nu/D$, as defined above.

For a Rayleigh number of fluid flow of less than $10^3$ the preferred temperature relationship for an upward-facing surface with peripheral enclosure as in FIG. 8, is given by the following relationship:

$$\Delta T > \frac{T_\infty}{KSc} + \frac{v_g T_\infty H}{2K\nu} \quad (8)$$

wherein the variables are as defined for equation (4).

From these relationships and accompanying figures, the structure, configuration and orientation of any surface may be optimized for any given task.

Within the scope of the invention, this includes performance of work on the object at the surface 13, as indicated by the block 56 in most of the drawings, without exclusion with respect to any of the drawings in which that block has not been shown. As shown at 57 in FIGS. 1 and 3, the surface 13, being protected against particle deposition as herein taught, is changed structurally while the thermophoretic effect dominates the combined effects of Brownian motion and gravitational deposition, by establishment of the above mentioned temperature difference $\Delta T$.

All kind of work may be performed in this manner, up to the most delicate very large-scale integration (VLSI) of electronic circuits on silicon and other semiconductor wafers. The benefits for photolithography and to material deposition or etching, as well as other spin-offs from such technology may be transferred to other delicate manufacturing processes as well, within the scope of the subject invention.

In the preferred embodiments of FIGS. 1 and 3 to 6, the protected surface is changed structurally while the thermophoretic effect dominates combined effects as disclosed above, and while that surface 13 is located within the above range including and extending from the substantially vertical position shown in FIGS. 1 to 4 to and including the downward-facing horizontal orientation of the protected surface 13 shown in FIGS. 5 and 6. In practice, this may require a redesign of the kind of prior-art machinery in which the surface being worked on faces upwardly, as in FIGS. 7 and 8.

Most advantageously, the surface is changed structurally while the thermophoretic effect dominates the combined effects as disclosed above and that surface 13 faces downwardly, as shown in FIGS. 5 and 6. By way of example, the teachings of FIG. 11 may advantageously be employed for that purpose.

On the other hand, there may be practical trade-offs which encourage, if not dictate, an orientation of the surface other than downward-facing horizontal. For those cases, it can, for instance, be seen from FIGS. 9 and 10 how even a vertical arrangement of the protected working surface 13, as in FIGS. 1 to 4, can have marked benefits in terms of reduction of contaminant particle deposition.

Other orientations and procedures can be worked out to fit different situations on the basis of the teachings herein provided.

The subject invention also provides articles of manufacture produced by methods herein disclosed, including changing a surface of an object structurally while the thermophoretic effect dominates combined effects of Brownian motion and gravitational deposition in the manner herein disclosed. While this aspect of the invention resists definition by other than the methods with which the claimed articles of manufacture are produced, our claimed articles independently meet the statutory requirements of novelty, utility and nonobviousness, both qualitatively and quantitatively.

First of all, our articles are characterized by a quality not achievable with prior-art processes, wherein deposition of particles continually interferes in various stages of the manufacturing process. For instance, in the semiconductor area, particle deposition of the kind herein discussed has been a severe limitation on achievable quality even by state-of-the-art processes in state-of-the-art environments. And even this is only an example of a prevailing prior-art limitation on achievable quality of delicate or advanced articles remedied by the subject invention.

From a mixed qualitative and quantitative point of view, particle deposition of the type herein discussed has been a severe limitation on the kind of progress and products demanded of very large-scale integration by technological necessity and of faster, larger and more compact systems.

The articles of the subject invention meet that need both qualitatively and quantitatively, by possessing not only a significantly better quality, but by also breaking an asymptotic deadlock to further miniaturization. Indeed, the practical lack of deposited particles enables our articles to have much smaller integrated circuits thereon than what was considered possible in prior-art products. This only by way of example, since high-precision and other articles obviously benefit from the practical lack of contaminants thereon.

Another quantitative aspect is the high number of rejects in manufacturing processes, which particularly plagues the VLSI industry. Lack of particle deposition on our articles significantly reduces rejects as well.

ANALYSIS

The theoretical bases for the temperature relationships of the subject invention are herein set forth.

Consider a surface with adjacent fluid containing suspended particles. The fluid is assumed to move by natural convection, induced by temperature differences between the surface and the fluid. Particles suspended in the fluid migrate under the combined effects of advection, Brownian motion, gravitational deposition and thermophoresis. The rate of particle deposition onto the surface may be predicted, given the surface orientation and size, the temperature difference between the fluid and the surface, and the size and density of the particles. By controlling the temperature difference, the thermophoretic force driving particles from the surface may be made sufficient to overcome the migration toward the surface arising from other migratory processes.

Calculations are carried out separately according to surface orientation. The case of a vertical surface is considered first. The rate of deposition of particles onto a semi-infinite, flat, vertical isothermal plate is analyzed.

By assumption, fluid extends without bound from one side of the plate. Outside a thin boundary layer adjacent to the plate, the fluid has uniform temperature and is motionless. Although this is an idealized system, the essential features of many real systems are accurately represented and thus the results have practical use. The problem of particle migration in the fluid boundary layer is described by a system of partial differential equations accounting for the conservation of mass, momentum, energy, and particle concentration within a differential fluid element. For a monodisperse suspension of particles under steady-state conditions these equations are $$\nabla \cdot u = 0 \quad (9)$$

$$u \cdot \nabla u = -\beta(T - T_\infty)g + \nu \nabla^2 u \quad (10)$$

$$u \cdot \nabla T = \alpha \nabla^2 T \quad (11)$$

$$u \cdot \nabla n = D \nabla^2 n - \nabla \cdot fn. \quad (12)$$

wherein:

u is the fluid velocity vector,
$\beta$ is the coefficient of thermal expansion for the fluid ($\beta = T_\infty^{-1}$ for an ideal gas),
T is the fluid temperature and $T_\infty$ is the reference fluid temperature (i.e. the temperature outside the boundary layer),
g is the gravitational acceleration vector,
$\nu$ and $\alpha$ are the kinematic viscosity and thermal diffusivity of the fluid, respectively,
n is the concentration of particles,
D is the coefficient of Brownian diffusivity of the particles, and
f is the velocity of the particles relative to the fluid, in particular due to gravitational settling and thermophoresis.

These equations incorporate several approximations. The fluid is treated as a Newtonian fluid with constant kinematic viscosity and thermal diffusivity. The Boussinesq approximation is employed, meaning that the fluid is considered to be incompressible, except in the body force term in the momentum equation. Heat generation due, for example, to viscous effects is neglected. Particle diffusivity is assumed to be constant, and, except for removal at the wall, the number of particles is conserved. The latter condition means that, among other things, the concentration is dilute enough that particle coagulation in the boundary layer can be ignored. A comparison of time constants for transport in the boundary layer and for coagulation shows that this is valid for most environments.

It is useful at this point to specify a coordinate system. The origin is taken to be at the leading corner of the plate. The x-coordinate is vertical, measuring the distance along the plate; the y-coordinate measures the horizontal distance from the plate. The velocity components in the x- and y-direction are u and v, respectively. The plate is considered to be infinitely wide so that the problem reduces to two dimensions. The plate also is assumed to extend infinitely from the leading edge in the direction of flow, i.e. downward for a cooled plate and upward for a heated plate.

Further simplifications of the governing equations can be made within the fluid boundary layer at locations where the boundary layer thickness is much smaller than the distance along the plate from the leading edge. The diffusion of momentum, heat and particles in the direction of the flow may be neglected. Also the y-component of the momentum equation reduces to a statement that the pressure is independent of y within the boundary layer.

The temperature gradient is small in the x-direction, so the thermophoretic flux is considered in the y-direction only. The resulting system of boundary layer equations is:

$$\frac{\partial u}{\partial x} + \frac{\partial v}{\partial y} = 0 \quad (13)$$

$$u \frac{\partial u}{\partial x} + v \frac{\partial u}{\partial y} = \nu \frac{\partial^2 u}{\partial y^2} + g|\Delta T|\theta\beta \quad (14)$$

$$u \frac{\partial \theta}{\partial x} + v \frac{\partial \theta}{\partial y} = \alpha \frac{\partial^2 \theta}{\partial y^2} \quad (15)$$

$$u \frac{\partial \omega}{\partial x} + v \frac{\partial \omega}{\partial y} = D \frac{\partial^2 \omega}{\partial y^2} - \frac{\partial(\nu_{t,y}\omega)}{\partial y} - v_g \frac{\partial \omega}{\partial x}, \quad (16)$$

wherein:
$\theta = (T - T_\infty)/(T_s - T_\infty)$,
$\Delta T = T_s - T_\infty$,
$\omega = n/n_\infty$,
$v_{t,y}$ is the y-component of the thermophoretic drift velocity, and
$v_g$ is the gravitational settling velocity.

The subscripts "s" and "$\infty$" signify values at the surface and at great distance from the surface, respectively.

The gravitational settling term in equation (16) leads to difficulties in obtaining a solution to this system of equations. As shown in the Appendix of our paper on PARTICLE DEPOSITION FROM A NATURAL CONVECTION FLOW ONTO A VERTICAL ISOTHERMAL FLAT PLATE, J. Aerosol Sci., Vol. 18, pp. 445–455 (1987), herewith incorporated by reference herein, it is justified to neglect this term as small for particles with aerodynamic diameter less than several $\mu$m assuming $|\Delta T|$ greater than a few tenths of a degree K. For mathematical convenience, the treatment of the gravitational settling term is neglected in this Analysis for the case of a vertical surface, but the subject invention nevertheless diminishes deposition of particles larger than the range specifically analyzed.

The thermophoretic velocity is thought to vary linearly with the temperature gradient and is commonly expressed as:

$$v_t = -K \frac{\nu}{T} \nabla T \tag{17}$$

The coefficient K depends on particle size and, for particles larger than the mean free path of fluid molecules (0.065 μm for air at 25° C. and 1 atm), on the ratio of the thermal conductivity of the fluid to that of the particle. In their above mentioned paper entitled "Thermophoresis of Particles in a Heated Boundary Layer," Talbot et al. give an interpolation formula for spherical particles that is argued to be reasonably accurate for all particle sizes.

$$K = 2C_s \frac{\left(\frac{k_g}{k_p} + 2\frac{C_t\lambda}{d_p}\right)\left[1 + \frac{\lambda}{d_p}(2.4 + 0.82e^{-(0.44d_p/\lambda)})\right]}{\left(1 + 6C_m\frac{\lambda}{d_p}\right)\left(1 + 2\frac{k_g}{k_p} + 4\frac{C_t\lambda}{d_p}\right)} \tag{18}$$

In this equation, $k_g$ and $k_p$ represent the thermal conductivity of the fluid and particle, respectively, $\lambda$ is the mean free path of fluid molecules, $d_p$ is the particle diameter, and $C_m$, $C_s$, and $C_t$ are coefficients of momentum exchange, thermal slip, and temperature jump, respectively. For particles in air, the coefficients have values $C_m = 1.146$, $C_s = 1.147$, and $C_t = 2.20$. For particles in air with $d_p \leq 3$ μm and $k_g/k_p$ in the range 0.01–0.5, K varies between 0.1 and 0.6; a representative value of K is 0.5, particularly for particles smaller than 1 μm.

Using equation (17), the term accounting for thermophoresis in equation (16) becomes:

$$-\frac{\partial(v_{t,y}\omega)}{\partial y} = \tag{19}$$

$$K\nu\frac{\partial}{\partial y}\left(\frac{\omega}{T}\frac{\partial T}{\partial y}\right) =$$

$$K\nu\left[\frac{1}{T}\frac{\partial \omega}{\partial y}\frac{\partial T}{\partial y} - \frac{\omega}{T^2}\left(\frac{\partial T}{\partial y}\right)^2 + \frac{\omega}{T}\frac{\partial^2 T}{\partial y^2}\right]$$

where K and $\nu$ have been assumed to be constant. The present interest is in systems in which the temperature differences are small compared with the absolute temperature, so in the coefficients involving $1/T$ and $1/T^2$, T may be approximated by $T_\infty$. In addition, the concentration boundary layer thickness, $\delta_c$, for particles in air of a size large enough for thermophoresis to play a significant role, is much smaller than the thickness, $\delta_t$, of the thermal boundary layer. The first term on the right-hand side of equation (19) is larger than the remaining terms by the ratio $\delta_t/\delta_c$, and only this term shall be retained. Substituting into equation (16), the governing equal for particle concentration in the boundary layer becomes:

$$u\frac{\partial \omega}{\partial x} + v\frac{\partial \omega}{\partial y} = D\frac{\partial^2 \omega}{\partial y^2} + \nu N_t\frac{\partial \omega}{\partial y}\frac{\partial \theta}{\partial y}, \tag{20}$$

wherein:

$N_t = K(T_s - T_\infty)/T_\infty$ is a dimensionless thermophoresis parameter.

It remains to specify boundary conditions for the system of equations (13) to (15), and (20). These are given below.

$$u(0, y) = u(x, 0) = u(x, \infty) = 0 \tag{21}$$

$$v(x, 0) = 0 \tag{22}$$

$$\theta(0, y) = \theta(x, \infty) = 0 \tag{23}$$

$$\theta(x, 0) = 1 \tag{24}$$

$$\omega(0, y) = \omega(x, \infty) = 1 \tag{25}$$

$$\omega(x, 0) = 0. \tag{26}$$

The classical problem of heat and momentum transfer for a vertical isothermal flat plate is reduced to a system of ordinary differential equations by means of a similarity transformation. This approach may be extended to analyze particle transport in the boundary layer.

The continuity equation is transformed by writing the velocity components in terms of the stream function $\Psi$:

$$u = \frac{\partial \Psi}{\partial y}; v = -\frac{\partial \Psi}{\partial x} \tag{27}$$

A solution for $\Psi$, $\theta$, and $\omega$ is sought such that:

$$\Psi = 4\nu cx^{\frac{3}{4}}\zeta(\eta)$$

$$\theta = \theta(\eta)$$

$$\omega = \omega(\eta),$$

where $$c = [g|\Delta T|\beta/4\mu^2]^{\frac{1}{4}}$$

$$\eta = cyx^{-\frac{1}{4}}$$

Substituting into the partial differential equations (14), (15) and (20), the following ordinary differential equations are obtained:

$$\zeta''' + 3\zeta\zeta'' - 2(\zeta')^2 + \theta = 0 \tag{28}$$

$$\theta'' + 3Pr\zeta\theta' = 0 \tag{29}$$

$$\omega'' + 3Sc\zeta\omega' + N_tSc\theta'\omega' = 0, \tag{30}$$

where primes indicate derivatives with respect to the independent variable $\eta$. The first two equations are the classical results describing momentum and heat transport in the boundary layer. Equation (30) describes particle transport in the boundary layer, with the terms on the left accounting for Brownian motion, advection, and thermophoresis, respectively.

The boundary conditions for these equations are:

$$\zeta(0) = \zeta'(0) = 0; \zeta'(\infty) = 0 \tag{31}$$

$$\theta(0) = 1; \theta(\infty) = 0 \tag{32}$$

$$\omega(0) = 0; \omega(\infty) = 1 \tag{33}$$

The system of equations was solved numerically using the shooting method for transforming the boundary value problem into an initial value problem, and a fourth-order Runge-Kutta integration routine.

Initially, to obtain precise boundary conditions for $\zeta''(0)$ and $\theta'(0)$ that satisfied the conditions at $\eta \to \infty$, the system (28), (29), (31) and (32) was solved for Pr=0.72 corresponding to air as the fluid.

Having obtained the solution to the momentum and heat transport equations, these equations were converted to an initial value problem by altering the boundary conditions (31) and (32):

$$\zeta(0) = \zeta'(0) = 0; \ \zeta''(0) = 0.675955 \tag{34}$$

$$\theta(0) = 1; \ \theta'(0) = -0.504599 \tag{35}$$

The system of equations (28)–(30) was then solved for $\omega'(0)$ subject to the boundary conditions (33)–(35). Solution were obtained for a range of values of $N_t$ corresponding to fluid-plate temperature differences from $-10$ to $10$ K (assuming $T_\infty = 293$ K, and K=0.5) and for a range numbers corresponding to particle diameters in air in the range $0.001-3.0$ μm (assuming $T_\infty = 293$ K).

The dimensionless particle flux is presented in FIG. 9 for a broad range of particle sizes and temperature differences for the case in which air is the fluid.

The normalized particle flux is given by the ratio of the flux density onto the plate or surface 13 to the concentration of particles outside the boundary layer. This parameter has the dimensions of a velocity and is commonly referred to in the air pollution literature as a deposition velocity. The normalized particle flux in dimensional form is obtained from the dimensionless particle flux in FIG. 9 by the equation:

$$v_d = (4Pr)^{-\frac{1}{4}} \alpha^{\frac{1}{2}} D^{\frac{2}{3}} \frac{Ra_x^{\frac{1}{4}}}{x} \{\omega'(0)/Le^{\frac{1}{3}}\}. \tag{36}$$

wherein: $Ra_x$ is the Rayleigh number, $$Ra_x = \frac{g|\Delta T|x^3 \beta}{\alpha \nu}$$

For particles of dp=0.01 μm in air the effect of the thermophoresis is small but significant. For particles as small as 0.1 μm, the effect of thermophoresis is substantial over the range of $N_t$ considered. For particles with diameters of order 1 μm, the difference in dimensionless particle flux for heated and cooled walls is striking. A large fraction of urban aerosol mass, including most black soot, is found in particles with diameters of a few micrometers or smaller.

The problem can be solved in this manner for any fluid and any sized particle by substituting appropriate values for the Prandtl number (Pr=$\nu/\alpha$), the thermophoresis parameter $N_t$, and the particle Schmidt number (Sc=$\nu/D$) into equations (29) and (30).

Using the results of this analysis, one may engineer a deliberate reduction in the rate of particle deposition to a vertically oriented surface.

An approximate condition to control particle deposition may be obtained by the method of scale analysis. Only the cases of Pr~1 and Pr>1 are considered, corresponding to a gas and a liquid such as water, respectively. From arguments regarding the size of the terms in equations (13)-(15), it may be shown [e.g. Bejan, A., CONVECTION HEAT TRANSFER, (Wiley Interscience, New York, 1984) Ch. 4] that the magnitude of the thickness of the momentum boundary layer, δ, is given by:

$$\delta \sim xRa_x^{-\frac{1}{4}}Pr^{\frac{1}{2}} \quad (37)$$

The magnitude of the thickness of the thermal boundary layer, $\delta_t$, is given by:

$$\delta_t \sim xRax^{-\frac{1}{4}} \quad (38)$$

In the thermal boundary layer, the peak fluid velocity along the plate scales as:

$$u_p \sim \frac{\alpha}{x}Ra_x^{\frac{1}{2}} \quad (39)$$

The scale analysis may be extended to include equation (20), from which one may obtain an approximate condition to control particle deposition.

Within the concentration boundary layer of thickness $\delta_c$, the fluid velocity along the plate scales as:

$$u_c \sim (\delta_c/\delta_t)tu_p \sim \delta_c(\alpha/x^2)Ra_x^{\frac{3}{4}} \quad (40)$$

To satisfy the continuity equation, the terms on the left-hand side of equation (20) must have equal magnitude, which is:

$$[\delta_c\alpha Ra_x^{\frac{3}{4}}/x^3]$$

On the right-hand side, the diffusion term has magnitude $$[D/\delta_c^2],$$

and the thermophoresis term has magnitude $$[N_t\nu Ra_x^{\frac{1}{4}}/(x\delta_c)]$$

If the surface is warm, and thermophoresis dominates Brownian motion in the concentration boundary layer, then a thin layer, essentially free of particles, is formed. The magnitude of the thickness of this layer, $\delta_c$, is determined by a balance between thermophoresis and advection. Using the magnitudes given above, one obtains:

$$\delta_c \sim \frac{x}{Ra_x^{\frac{1}{4}}}N_t^{\frac{1}{2}}\cdot Pr^{\frac{1}{2}} \quad (41)$$

In this case, deposition of particles on the surface of the plate is negligible.

If, on the other hand Brownian motion dominates thermophoresis, then the thickness of the concentration boundary layer is obtained by balancing the advection and diffusion terms in equation (20):

$$\delta_c \sim xLe^{-\frac{1}{3}}Ra_x^{-\frac{1}{4}}, \quad (42)$$

wherein: Le =° /D is the particle Lewis number. The particle flux density is determined by the rate of diffusion of particles onto the plate. The magnitude of the normalized flux of particles onto the plate, $v_d$, is therefore:

$$v_d = D\left(\frac{\partial\omega}{\partial y}\right)_{y=0} \sim \frac{D^{\frac{2}{3}}\alpha^{\frac{1}{3}}}{x}Ra_x^{\frac{1}{4}} \quad (43)$$

The condition needed to control deposition through the use of thermophoresis is that the concentration boundary layer thickness given by equation (41) is much greater than that given by equation (42).

i.e. $N_t >> Pr^{-1} Le^{-\frac{2}{3}}$ (44)

or $\Delta T >> \dfrac{T_\infty}{K\, Pr\, Le^{\frac{2}{3}}}$ (45)

For horizontally oriented surfaces theoretical descriptions of natural-convection boundary layer flows are unavailable. An estimate of particle deposition rate can be made by analogy between heat transfer and mass transfer, using data on natural-convection heat transfer rates that are available in the literature.

The analogy between heat and mass transfer arises because the governing equations for the temperature distribution and pollutant concentration for dilute, highly reactive molecular size contaminants in a forced convection flow are of analogous form. The normalized pollutant concentration, $\omega = C/C_\infty$, is analogous to the normalized temperature difference, $1-\theta$, where $\theta = (T-T_\infty)/(T_s-T_\infty)$ and $T_s$ is the surface temperature. The pollutant diffusivity, D, is analogous to the thermal diffusivity, $\alpha$. However, because density differences resulting from temperature gradients generate natural convection flows, but density differences resulting from differences in pollutant concentration are too small to do so, the analogy does not strictly hold for the case of natural convection flows. Nevertheless, the approximation that this analogy still holds provides the most accurate practical tool currently available for obtaining estimates of pollutant deposition velocities. For pollutants having the same phase as the fluid (e.g. gases in air), the analogy can be applied by substituting the Schmidt number, $Sc = \nu/D$ for the Prandtl number, $Pr = \nu/\alpha$, and by substituting the Sherwood number, $Sh = v_d x/D$, for the Nusselt number, $Nu = h\, x/k_g$, in empirical expressions for the heat transfer rate observed in natural convection flows. In these expressions, x represents the distance along the surface from the leading edge in the direction of flow, h is the heat transfer coefficient (units W m$^{-2}$ K$^{-1}$), and $k_g$ is the thermal conductivity of the fluid (units W m$^{-1}$ K$^{-1}$).

For the case of fluid-borne particles, the same substitutions are made to estimate particle deposition rates due to convective diffusion from the natural-convection heat-transfer data. A warning must be inserted at this point that the Schmidt number for particles in air is generally much higher than the Prandtl number of fluids. Thus any failure of the heat transfer results to extrapolate well to high Pradtl numbers will lead to inaccurate results. Particle migration is affected by thermophoresis and gravitational sedimentation also. As these effects are not embodied in the heat transfer analogy, they will be accounted for by vectorially adding the deposition flux due to those processes to the flux due to convective deposition, $v_D$:

$v_d = v_D + v_t + s_g\, v_g$ (46)

where $s_g$ is a surface orientation coefficient equal to $-1$ for a downward-facing surface, and $+1$ for an upward-facing surface. The objective of the subject invention is to use the thermophoretic velocity to attain $v_d < 0$, implying a greatly reduced rate of particle deposition.

The temperature gradient near the surface is needed to compute the thermophoretic velocity. This may be obtained directly from the empirical expressions for Nu and the definition of the heat transfer coefficient. In the results presented below, one of two relationships is used to determine the thermophoretic velocity from the empirically determined Nusselt number, according to whether a horizontal dimension, L, of the surface, or the height, H, of a full enclosure is used in the definition of Nu:

$$v_{t,L} = -N_t\left(\frac{\nu}{L}\right)\overline{Nu_L} \tag{47}$$

$$v_{t,H} = -N_t\left(\frac{\nu}{H}\right)\overline{Nu_H} \tag{48}$$

Here the coefficient $N_t$ is a thermophoresis parameter, defined by $N_t = K\,(T_s - T_\infty)/T_\infty$, and the overbar denotes an average over the surface.

It is necessary to distinguish surfaces according to whether they are "enclosed" or "isolated." For the present purposes, an enclosed horizontal surface is one with vertical surfaces extending from it along all sides. Ceilings and floors are common examples of enclosed horizontal surfaces. An example of an isolated horizontal surface is a desk top. The distinction is made because there are stable temperature differences for enclosed surfaces, whereas for isolated surfaces any temperature difference induces flow.

For an enclosed horizontal surface, no flow occurs if the surface is upward facing and cooler than the air, or if the surface is downward facing and warmer than the air. In addition, no flow occurs whenever $Ra_H < 0(10^3)$. For the no-flow condition, the pollutant concentration and temperature profiles are approximated as the steady-state solutions to the one-dimensional diffusion and conduction equations, respectively. Under this approximation, a constant gradient is obtained between the surface and (a) the midline of a full enclosure of height H, such as a room, or (b) the unbounded surface of a peripheral enclosure of height H' (corresponding to half the height H of a full enclosure) as in FIGS. 6 and 8. The resulting transport velocity due to diffusion is the diffusion coefficient divided by half the height of a full enclosure. Thus, $$v_d = s_g\, v_g + v_{t,H} + 2\,\frac{D}{H} \tag{49}$$

And, in determining the thermophoretic transport velocity, the mean Nusselt number is given by $$\overline{Nu_H} = 2 \tag{50}$$

Rearranging equation (49) and solving for $v_d < 0$ leads to the temperature relationship given in equations (4 ) and (8 ) set forth above.

If the temperature gradient leads to an unstable atmosphere, convective flow is induced and the deposition velocity is enhanced. In this case, the deposition velocity is estimated by the analogy between heat and mass transfer from the following expressions, derived from the work of Globe and Dropkin [Globe, S., and Dropkin, D. (1959), "Natural convection heat transfer in liquids confined by two horizontal plates and heated from below," J. Heat Transfer, 81, 24-28.] and appropriate for $3 \times 10^5 < Ra_H < 1.4 \times 10^9$:

$$v_d = s_g v_g + v_{t,H} + \frac{D}{H} \{0.087\, Ra_H^{\frac{1}{3}} Sc^{0.074}\} \quad (51)$$

$$Nu_H = 0.087\, Ra_H^{\frac{1}{3}} Pr^{0.074} \quad (52)$$

Rearranging equation (51) and solving for $v_d < 0$ leads to the temperature relationship given in equation (7).

Now consider isolated surfaces. In the correlations that follow, the characteristic length, L, of the surface is the area of the surface divided by the perimeter. For an upward facing heated surface, or a downward facing cool surface, the deposition velocity may be estimated from the analogy between heat and mass transfer by the following expressions [Incropera, F. P. and DeWitt, D. P. (1985), Fundamentals of Heat and Mass Transfer, Wiley, New York, Ch. 9]:

$$\text{For } 10^4 < Ra_L < 10^7: v_d = s_g v_g + v_{t,L} + \frac{D}{L} \{0.54\, Ra_L^{\frac{1}{4}}\} \quad (53)$$

$$Nu_L = 0.54\, Ra_L^{\frac{1}{4}} \quad (54)$$

$$\text{For } 10^7 < Ra_L < 10^{11}\; v_d = s_g v_g + v_{t,L} + \frac{D}{L} \{0.15\, Ra_L^{\frac{1}{3}}\} \quad (55)$$

$$Nu_L = 0.15\, Ra_L^{\frac{1}{3}} \quad (56)$$

For a downward facing heated surface or an upward facing cool surface, and for $10^5 < Ra < 10^{10}$ the following expressions are appropriate:

$$v_d = s_g v_g + v_{t,L} + \frac{D}{L} \{0.27\, Ra_L^{\frac{1}{4}}\} \quad (57)$$

$$\overline{Nu_L} = 0.27\, Ra_L^{\frac{1}{4}} \quad (58)$$

Rearranging equations (53), (55) and (57) and solving for $v_d < 0$ leads to the temperature relationships in equations (5), (6) and (3), respectively, as set forth above.

The subject extensive disclosure will render apparent or suggest to those skilled in the art various modifications and variations within the spirit and scope of the subject invention and equivalents thereof.

We claim:

1. A method of reducing deposition of fluid-borne particles in a diameter range of from one-hundredth of a micron to several microns from a convection boundary layer flow onto a surface of an object to be protected, comprising the step of:
    causing thermophoretic effect to dominate the combined effects of Brownian motion and gravitational sedimentation of said particles in said boundary layer flow by establishing a temperature difference between said surface of the object and adjacent fluid such that the temperature of said surface is higher than that of said adjacent fluid by not more than 10K.

2. A method as claimed in claim 1, including the step of:

performing work on said object to change said surface structurally while said thermophoretic effect dominates said combined effects.

3. A method as claimed in claim 1, wherein:

said object is heated at said surface relative to said adjacent fluid.

4. A method as claimed in claim 1, wherein:

said adjacent fluid is cooled relative to said surface of the object.

5. A method as claimed in claim 1, including the step of:

enclosing said surface laterally.

6. A method as claimed in claim 1, including the step of:

reducing deposition by gravitational sedimentation of said particles by arranging said object such that said surface is located within a range including and extending from a substantially vertical to and including a downwardfacing horizontal orientation of said surface.

7. A method as claimed in claim 6, including the step of:

performing work on said object to change said surface structurally while said thermophoretic effect dominates said combined effects, and while said surface is located within said range.

8. A method as claimed in claim 1, wherein:

said surface of the object extends substantially vertically; and the following temperature relationship is established:

$$\Delta T >> \frac{T_\infty}{K} Le^{-1/3}\ Pr^{-1}$$

wherein:

surface minus the temperature of said adjacent fluid, $T_\infty$,

K is the thermophoresis coefficient of the particles,

Le is the particle Lewis number,

Pr is the Prandtl number of the fluid, and >> means several times higher than.

9. A method as claimed in claim 8, including the step of:

performing work on said object to change said surface structurally while said thermophoretic effect dominates said combined effects.

10. A method as claimed in claim 1, wherein:

said surface of the object faces downwardly; and the following temperature relationship is established:

$$\Delta T > \frac{T_\infty}{K\,Sc} = \frac{v_g\,T_\infty\,L}{K\,\nu\,\{0.27\ Ra_L^{1/4}\}}\quad 10^5 < Ra_L < 10^{10}$$

wherein:

$\Delta T$ is the temperature of the object at said surface minus the temperature of said adjacent fluid, $T_\infty$, K is the thermophoresis coefficient of the particles, Sc is the particle Schmidt number, $v_g$ is gravitational particle settling velocity, $\nu$ is the kinematic viscosity of the fluid, L is the characteristic length of said surface, given by the ratio of surface area to surface perimeter, and $Ra_L$ Rayleigh number of the flow, defined by $$Ra_L = \frac{g\beta|\Delta T|L^3}{\alpha\nu}$$

wherein:
g is the acceleration of gravity,
α is the thermal diffusivity of the fluid, and
β is the coefficient of thermal expansion of the fluid.

11. A method as claimed in claim 10, including the step of:
performing work on said object to change said surface structurally while said thermophoretic effect dominates said combined effects and said surface faces downwardly.

12. A method as claimed in claim 1,
said surface is open to fluid flow at its perimeter.

13. A method as claimed in claim 1, wherein:
said surface of the object faces downwardly and is provided with either a full enclosure of height H, or a peripheral enclosure of height H' (corresponding to half a height H of a full enclosure); and
the following temperature relationship is established:

$$\Delta T > \frac{T_\infty}{K\,Sc} - \frac{v_g\,T_\infty\,H}{2K\,\nu}$$

wherein:
T is the temperature of the object at said surface minus the temperature of said adjacent fluid, $T_\infty$,
K is the thermophoresis coefficient of the particles,
Sc is the particle Schmidt number,
$v_g$ is gravitational particle settling velocity,
$\nu$ is the kinematic viscosity of the fluid.

14. A method as claimed in claim 13, including the step of:
performing work on said object to change said surface structurally while said thermophoretic effect dominates said combined effects 15. A method as claimed in claim 1, wherein:
said surface of the object faces upwardly; and
the following temperature relationship is established:

$$\Delta T > \frac{T_\infty}{K\,Sc} + \frac{v_g\,T_\infty\,L}{K\,\nu\,\{0.54\,Ra_L^{\frac{1}{5}}\}} \quad 10^4 < Ra_L < 10^7$$

wherein:
$\Delta T$ is the temperature of the object at said surface minus the temperature of said adjacent fluid, $T_\infty$,
K is the thermophoresis coefficient of the particles,
Sc is the particle Schmidt number,
$v_g$ is gravitational particle settling velocity,
$\nu$ is the kinematic viscosity of the fluid,
L is the characteristic length of said surface, given by the ratio of surface area to surface perimeter, and
$Ra_L$ is the Rayleigh number of the flow, defined by $$Ra_L = \frac{g\beta|\Delta T|L^3}{\alpha\nu}$$

where:
g is the acceleration of gravity,
α is the thermal diffusivity of the fluid, and
β is the coefficient of thermal expansion of the fluid.

16. A method as claimed in claim 15, including the step of:
performing work on said object to change said surface structurally while said thermophoretic effect dominates said combined effects.

17. A method as claimed in claim 1, wherein:
said surface of the object faces upwardly; and
the following temperature relationship is established:

$$\Delta T > \frac{T_\infty}{K\,Sc} + \frac{v_g\,T_\infty\,L}{K\,\nu\,\{0.15\,Ra_L^{\frac{1}{3}}\}} \quad 10^7 < Ra_L < 10^{11}$$

wherein:
$\Delta T$ is the temperature of the object at said surface minus the temperature of said adjacent fluid, $T_\infty$,
K is the thermophoresis coefficient of the particles,
Sc is the particle Schmidt number,
$v_g$ is gravitational particle settling velocity,
$\nu$ is the kinematic viscosity of the fluid,
L is the characteristic length of said surface, given by the ratio of surface area to surface perimeter, and
$Ra_L$ is the Rayleigh number of the flow, defined by $$Ra_L = \frac{g\beta|\Delta T|L^3}{\alpha\nu}$$

wherein:
g is the acceleration of gravity,
α is the thermal diffusivity of the fluid, and
β is the coefficient of thermal expansion of the fluid.

18. A method as claimed in claim 17, including the step of:
performing work on said object to change said surface structurally while said thermophoretic effect dominates said combined effects.

19. A method as claimed in claim 1, wherein:
said surface of the object faces upwardly and is provided with a full enclosure; and
the following temperature relationship is established:

$$\Delta T > \frac{T_\infty\,Le^{0.074}}{K\,Sc} + \frac{v_g\,T_\infty\,H}{K\,\nu\,\{0.087\,Ra_H^{\frac{1}{3}}\,Pr^{0.074}\}}$$

wherein:
$\Delta T$ is the temperature of the object at said surface minus the temperature of said adjacent fluid, $T_\infty$,
K is the thermophoresis coefficient of the particles,
Le is the particle Lewis number,
Pr is the Prandtl number of the fluid,
Sc is the particle Schmidt number,
$v_g$ is gravitational particle settling velocity,
$\nu$ is the kinematic viscosity of the fluid, and
$Ra_H$ is the Rayleigh number of the flow, defined by $$Ra_H = \frac{g\beta|\Delta T|H^3}{\alpha\nu}$$

wherein:
g is the acceleration of gravity,
α is the thermal diffusivity of the fluid, $\beta$ is the coefficient of thermal expansion of the fluid, and H is the height of said enclosure.

20. A method as claimed in claim 19, including the step of:

performing work on said object to change said surface structurally while said thermophoretic effect dominates said combined effects.

21. A method as claimed in claim 1, wherein:

said surface of the object faces upwardly and is provided with either a full enclosure of height H, or a peripheral enclosure of height H' (corresponding to half a height H of a full enclosure); and the following temperature relationship is established for $Ra_H < 10^3$:

$$\Delta T > \frac{T_\infty}{K\,Sc} + \frac{v_g\,T_\infty\,H}{2K\,\nu}$$

wherein:

$\Delta T$ is the temperature of the object at said surface minus the temperature of said adjacent fluid, $T_\infty$, K is the thermophoresis coefficient or one particles, Sc is the particle Schmidt number, $v_g$ is gravitational particle settling velocity, $\nu$ is the kinematic viscosity of the fluid.

22. A method as claimed in claim 21, including the step of:

performing work on said object to change said surface structurally while said thermophoretic effect dominates said combined effects.

23. A method as claimed in claim 1, wherein:

a flux to said surface of gas-borne particles of diameters listed in FIG. 9 is reduced by establishing a temperature difference ($\Delta T$) between said surface of the object ($T_s$) and adjacent fluid ($T_\infty$) pursuant to the curves shown in said FIG. 9 for particle diameters of 0.1 micrometer and larger.

* * * * *